(12) United States Patent
Caruel et al.

(10) Patent No.: US 9,562,595 B2
(45) Date of Patent: Feb. 7, 2017

(54) DOUBLE-ACTING LINEAR ACTUATOR

(71) Applicant: AIRCELLE, Gonfreville l'Orcher (FR)

(72) Inventors: Pierre Caruel, Le Havre (FR); Pierre Moradell-Casellas, Saint Georges des Groseillers (FR)

(73) Assignee: AIRCELLE, Gonfreville l'Orcher (FR)

( * ) Notice: Subject to any disclaimer, the term of this patent is extended or adjusted under 35 U.S.C. 154(b) by 289 days.

(21) Appl. No.: 14/166,524

(22) Filed: Jan. 28, 2014

(65) Prior Publication Data

US 2014/0245743 A1 Sep. 4, 2014

Related U.S. Application Data

(63) Continuation of application No. PCT/FR2012/051407, filed on Jun. 21, 2012.

(30) Foreign Application Priority Data

Jul. 29, 2011 (FR) .................................... 11 56986

(51) Int. Cl.
*F02K 1/62* (2006.01)
*F16H 25/12* (2006.01)
(Continued)

(52) U.S. Cl.
CPC .............. *F16H 25/12* (2013.01); *F02K 1/625* (2013.01); *F02K 1/72* (2013.01); *F02K 1/763* (2013.01);
(Continued)

(58) Field of Classification Search
CPC .............. F02K 1/62; F02K 1/625; F02K 1/70; F02K 1/72; F02K 1/74; F02K 1/763
See application file for complete search history.

(56) References Cited

U.S. PATENT DOCUMENTS 6,167,694 B1 * 1/2001 Davies .................... F02K 1/763
60/226.2
8,104,261 B2 * 1/2012 Marshall .................. F02K 1/09
239/265.19
(Continued)

FOREIGN PATENT DOCUMENTS

DE 20 2009 007347 A1 9/2010
FR 2 922 058 A1 4/2009
(Continued)

OTHER PUBLICATIONS

International Search Report issued Aug. 20, 2012 in International Application No. PCT/FR2012/051407.

*Primary Examiner* — Arun Goyal
(74) *Attorney, Agent, or Firm* — Burris Law, PLLC

(57) ABSTRACT

The present disclosure relates to a double-acting linear actuator for moving an inner part and an outer part of a cowl relative to a fixed frame. The linear actuator includes a first tubular body housing a first drive shaft and a second tubular body housing a second drive shaft. In particular, the first and second tubular bodies are mounted in series by the second drive shaft which is mounted on the first tubular body. The second drive shaft translates the second tubular body relative to the first tubular body when a lock of the first tubular body is in a locked position, and the first drive shaft translates both the first tubular and second tubular bodies when the lock is in an unlocked position.

12 Claims, 3 Drawing Sheets

Figure 1:
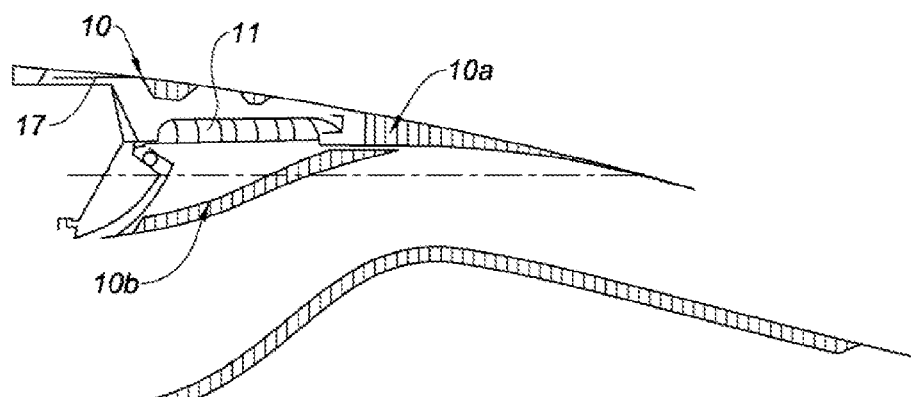

(51) Int. Cl.
    *F02K 1/72*         (2006.01)
    *F02K 1/76*         (2006.01)
    *F16H 25/20*       (2006.01)

(52) U.S. Cl.
    CPC ....... *F16H 25/20* (2013.01); *F16H 2025/2059* (2013.01); *F16H 2025/2075* (2013.01); *Y02T 50/671* (2013.01); *Y10T 74/18576* (2015.01)

(56) References Cited

U.S. PATENT DOCUMENTS

| | | | |
|---|---|---|---|
| 8,931,253 B2 * | 1/2015 | Baudu | F02K 1/72 244/110 B |
| 8,943,794 B2 * | 2/2015 | Moradell-Casellas | F02K 1/72 239/265.31 |

FOREIGN PATENT DOCUMENTS

| | | |
|---|---|---|
| FR | 2 922 059 A1 | 4/2009 |
| FR | 2 922 981 A1 | 5/2009 |
| WO | 2007/099333 A1 | 9/2007 |

\* cited by examiner

DOUBLE-ACTING LINEAR ACTUATOR

CROSS-REFERENCE TO RELATED APPLICATIONS

This application is a continuation of International Application No. PCT/FR2012/051407, filed on Jun. 21, 2012, which claims the benefit of FR 11/56986, filed on Jul. 29, 2011. The disclosures of the above applications are incorporated herein by reference.

FIELD

The present disclosure relates to an actuator for a thrust reverser for a turbojet engine nacelle.

BACKGROUND

The statements in this section merely provide background information related to the present disclosure and may not constitute prior art.

An airplane is moved by several turbojet engines each housed in a nacelle also housing a set of related actuating devices connected to its operation and performing various functions when the turbojet engine is running or stopped.

These related actuating systems in particular comprise a thrust reverser actuating system.

A nacelle generally has a tubular structure comprising an air intake upstream from the turbojet engine, a middle section intended to surround a fan of the turbojet engine, and a downstream section housing thrust reverser means and intended to surround the combustion chamber of the turbojet engine, and generally ends with a jet nozzle whereof the outlet is situated downstream from the turbojet engine.

This nacelle is generally intended to house a dual flow turbojet engine capable of using rotating fan blades to generate a flow of hot air (also called primary flow) coming from the combustion chamber of the turbojet engine, and a flow of cold air (secondary flow) that circulates outside the turbojet engine through an annular tunnel formed between the fairing of the turbojet engine and an inner wall of the nacelle.

The two flows of air are discharged from the turbojet engine through the rear of the nacelle.

During landing of an airplane, the role of a thrust reverser is to improve the braking capacity of said airplane by reorienting at least part of the thrust generated by the turbojet engine forward.

During this phase, the reverser obstructs the cold flow tunnel and orients said cold flow toward the front of the nacelle, thereby generating a counterthrust that is added to the braking of the wheels of the airplane.

The means used to carry out that reorientation of the cold flow vary depending on the type of reverser.

However, in all cases, the structure of a reverser comprises moving cowls that can be moved between a deployed position in which they open a passage in the nacelle that is intended for the deflected flow on the one hand, and a retracted position in which they close that passage on the other hand. These cowls may serve for deflection or simply to activate other deflecting means.

In the case of a grid reverser, also known as a cascade reverser, the flow of air is reoriented by cascade vanes, the cowl then serving only to slide so as to expose or cover said vanes, the translation of the moving cowl being done along a longitudinal axis substantially parallel to the axis of the nacelle.

Additional blocking doors, activated by the sliding of the cowl, generally allow the tunnel to be closed downstream from the vanes so as to optimize the reorientation of the cold flow.

Aside from its thrust reversal function, the sliding cowl belongs to the rear section and has a downstream side forming a jet nozzle with a variable section intended to channel the discharge of the flows of air.

This nozzle may supplement a primary nozzle channeling the hot flow, and is then called secondary nozzle.

To respond to the issues of adapting the section of the nozzle to the various flight phases, in particular the takeoff and landing phases of the airplane, a thrust reverser has in particular been proposed like that illustrated in FIG. 1.

This thrust reverser comprises cascade vanes 11 for at least part of the airflow of the turbojet engine on the one hand, and at least one cowl 10 translatable in a substantially longitudinal direction of the nacelle able to move alternatively between a closed position, in which it provides the aerodynamic continuity of the nacelle and covers the cascade vanes 11, and an open position, in which it opens a passage in the nacelle and exposes the cascade vanes 11, on the other hand.

The moving cowl 10 comprises an outer part 10a and an inner part 10b each mounted translatably; the outer part 10a (downstream side of the cowl 10) forms a jet nozzle intended to channel the discharge of the flows of air.

By dividing the moving cowl 10 into an inner part 10b and an outer part 10a that are at least partially movable independently from one another, it is possible to adapt the relative positions of the outer part 10a and the inner part 10b to the flight conditions so as to vary the section of the jet nozzle formed by the moving cowl 10 by varying the length of the inner aerodynamic line of the moving cowl 10, both when the moving cowl 10 is in the closed position and exposes the cascade vanes 11, and when the moving cowl 10 is in the open position.

One recurring problem lies in the actuating system proposed to provide maneuvering of the nozzle, during the different flight phases, both when the thrust reverser device is in the direct jet phase and when it is in the reverse jet phase. In fact, such a system must be able to command a variable jet nozzle section when the thrust reverser is locked in the closed position, the variable nozzle reciprocally being in a maximally deployed position when the thrust reverser is deployed.

Telescoping electric cylinders have already been proposed in which a first rod moves the inner part 10b of the cowl and a second rod, slidingly mounted in first rod, moves the outer part 10a of the cowl.

However, this solution is not optimal: such an electric cylinder generally presents actuating difficulties.

In fact, the second rod being movable relative to the base of the cylinder, it is difficult to group the actuating means together in said base of the cylinder, and the second rod must generally be equipped with its own motor, which will therefore also be movable.

To resolve these actuating difficulties, application FR 2,922,059 proposes a double-acting telescoping linear actuator comprising a base, intended to be attached to a stationary element of the reverser, and serving as a housing for a first rod whereof the rotation is blocked and which can be translated by means of a drive shaft intended to be connected to means for rotational driving, the first rod being intended to be attached by one end to the end part of the nozzle-forming cowl, the first rod supporting a second rod positioned in the extension thereof and intended to be attached by one end to the rest of the cowl to be moved, said second rod being able to be blocked in rotation and translated by means of a second drive shaft passing through the base and connected to rotational driving means.

In this actuator, the means for driving the rods comprise a motor capable of driving an input shaft by at least one differential, said differential on the one hand having a first output shaft connected to one of the first or second drive shafts, and on the other hand, a second output shaft connected to the second or first drive shaft.

A differential refers to any mechanical means making it possible to distribute a drive speed to several output shafts by distributing the kinematic force.

Such an actuator makes it possible, by driving the rods of the actuator by means of the differential, to move one or the other of the moving parts of the cowl through a single motor means.

Furthermore, such an arrangement makes it possible to group the actuating means of the two rods of the actuator together in the base of the latter.

However, the presence of the differential involves having two distinct drive chains, one for each of the drive shafts of the two parts of the cowl.

Consequently, the mass, bulk, and therefore cost of the actuating system are still affected.

This excess mass is additionally detrimental to the performance of the turbojet engine(s) and deteriorates them.

Furthermore, such a solution with multiple drive chains is complex to implement.

SUMMARY

The present disclosure provides a double-action linear actuator making it possible to simplify the system for actuating a thrust reverser while remaining reliable and effective.

It also proposes a double-action linear actuator reducing the mass of the thrust reverser actuating system relative to the existing systems, thereby decreasing costs and significantly improving the performance of the turbojet engine of the propulsion assembly.

Another aspect of the present disclosure is to propose a double-action linear actuator meeting the demands of thrust reverser actuating systems with variable section nozzles: allowing the variation of the jet nozzle section when the thrust reverser is locked in the closed position.

To that end, the present disclosure proposes a double-action linear actuator for moving a first element and a second element relative to a stationary element, said actuator comprising:

a first tubular element provided with means suitable for attaching said first tubular element to said first element to be moved, a first drive shaft, housed in the first tubular element and capable of translating the first tubular element relative to the stationary element, a second tubular element including means suitable for attaching it to the second element to be moved, and a second drive shaft, housed in the second tubular element, capable of translating the second tubular element relative to the stationary element.

The actuator is remarkable in that the two tubular elements are mounted in series by means of the second drive shaft, which is mounted stationary on the first tubular element, such that the two drive shafts belong to a same actuating chain in which the second drive shaft translates the second tubular element relative to the first tubular element when the locking means of the first tubular element are in the locked position and wherein the first drive shaft translates both the first tubular element and the second tubular element relative to the stationary element when the locking means are in the unlocked position.

According to other features of the actuator according to the present disclosure, considered alone or in combination:

the actuator comprises a base intended to be attached to the stationary element and supporting the first drive shaft;

the first drive shaft is mounted rotatably relative to the base;

the locking means are suitable so as, in the locked position, to prohibit any translation of the first tubular element relative to the base while leaving it free to rotate relative to the latter;

the means suitable for attaching the second tubular element to the second element is suitable for locking the rotation of the second tubular element;

the means suitable for attaching said first tubular element to the first element to be moved are suitable for allowing the rotation of the first tubular element;

the means suitable for attaching said first tubular element to the first element to be moved comprise pins connected on the one hand to the first element by means of a rolling bearing or ball bearing, and on the other hand by a connecting rod-rudder bar assembly mounted on the first element to be moved;

the first and second drive shafts are ball screws;

the pitches of the ball screws may be different;

the actuator comprises a single drive motor with a single output shaft driving only the first drive shaft.

The present disclosure further relates to a thrust reverser for a turbojet engine comprising means for deflecting at least part of an air flow of the turbojet engine on the one hand, and on the other, at least one cowl translatable in a direction substantially parallel to the longitudinal axis of the nacelle able to move alternatively from a closed position in which it provides the aerodynamic continuity of the nacelle and covers the deflecting means, to an open position in which opens the passage of the nacelle and exposes the deflecting means, the moving cowl comprising at least one end part forming a jet nozzle, said part being mounted translatably relative to the rest of the cowl, remarkable in that it also comprises an actuator according to the present disclosure allowing the movement of the moving cowl and the jet nozzle.

Further areas of applicability will become apparent from the description provided herein. It should be understood that the description and specific examples are intended for purposes of illustration only and are not intended to limit the scope of the present disclosure.

DRAWINGS

Figure 2:
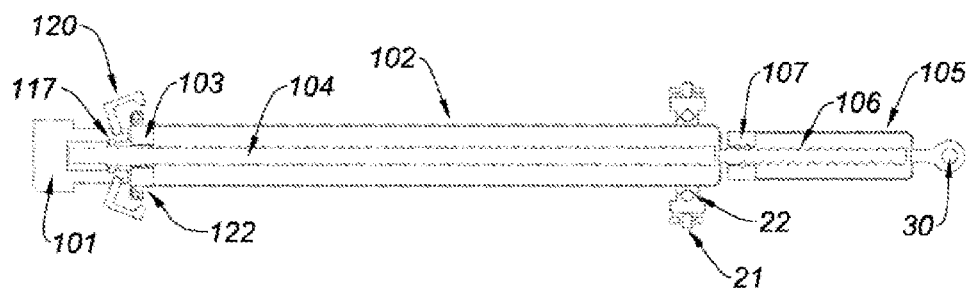
Figure 3:
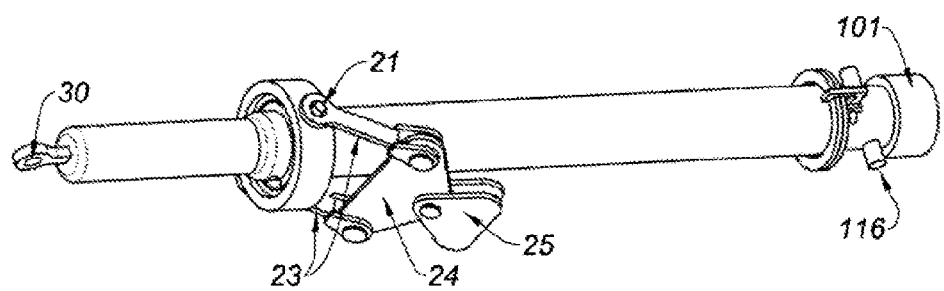
Figure 4:
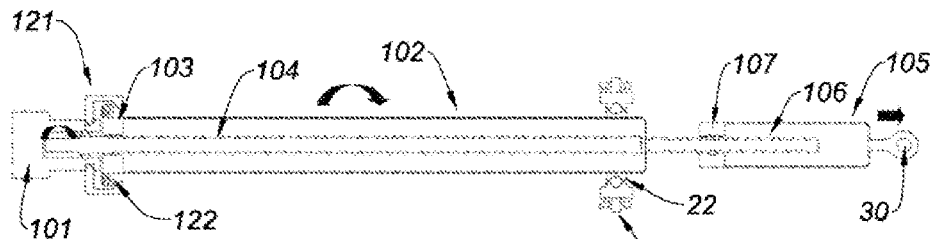
Figure 5:
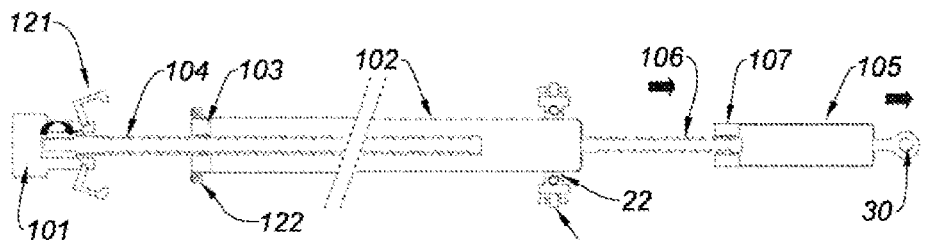
Figure 6:
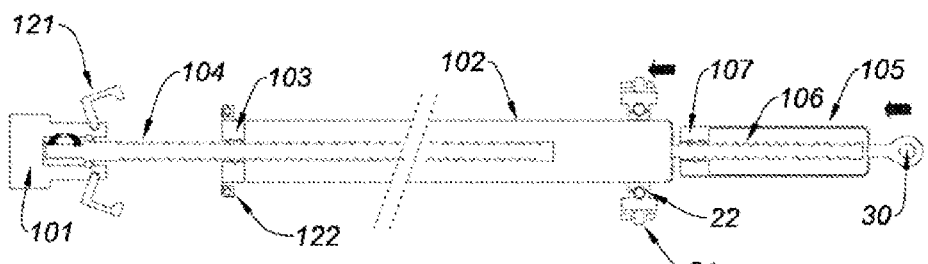
Figure 7:
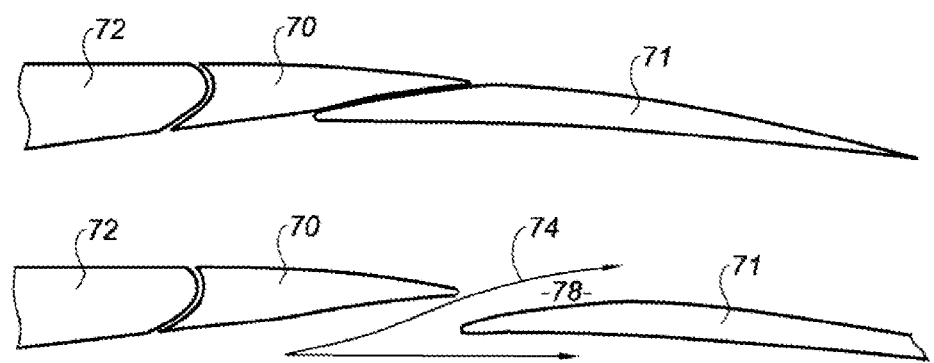

In order that the disclosure may be well understood, there will now be described various forms thereof, given by way of example, reference being made to the accompanying drawings, in which:

FIG. 1 is a partial diagrammatic longitudinal cross-sectional view of a thrust reverser equipped with a moving cowl separated into an inner part and an outer part that are movable relative to one another;

FIG. 2 diagrammatically shows a double-action linear actuator according to one form of the present disclosure that may in particular and not exclusively be applied to the thrust reverser of FIG. 1;

FIG. 3 is a perspective view of the actuator of FIG. 2 provided with means for attaching to a thrust reverser, in particular that of FIG. 1;

FIGS. 4 to 6 diagrammatically shows the steps for actuating the double-action linear actuator during different flight phases of an aircraft, i.e., respectively, during a variation of the jet nozzle section, during a thrust reversal, and during closure of the thrust reverser; and FIG. 7 shows the jet nozzle section being varied by forming an air passage between a cowl and a jet nozzle.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

In all of these figures, identical or similar numbers designate identical or similar members or sets of members.

It will be noted that the terms "upstream" and "downstream" are to be understood relative to the direction of the flow of air in the turbojet engine.

It will also be noted that, for ease of comprehension, the description of the double-action linear actuator according to the present disclosure will be done in light of the thrust reverser as illustrated in FIG. 1 and previously described. However, this application is not limiting.

Such actuators are intended for any reverser whereof the moving cowl is equipped with an end jet nozzle section mounted movably relative to the cowl so as to form a so-called variable jet nozzle and, more generally, intended for any movement of the first and second elements relative to a stationary element.

Thus, they are in particular intended to actuate a cowl and a jet nozzle whereof the output section is varied through the geometric increase of the output section of the jet nozzle.

As illustrated in FIG. 7, they are also intended to actuate a cowl 70 and a jet nozzle 71 with a variable section that are movable relative to a stationary nacelle structure 72, the jet nozzle output section being varied by forming an air passage 78 between the cowl 70 and the jet nozzle 71 creating an additional flow between the cowl 70 and the jet nozzle 71. This flow is illustrated by the arrows 74.

In reference to FIGS. 1 to 3, the double-action linear actuator 100 aims to allow the inner cowl 10 part 10b and the outer cowl part 10a to move relative to a stationary element, here a stationary front frame 17 of the thrust reverser.

The actuator 100 comprises a base 101 provided to be attached the stationary front frame 17 using any suitable means.

As illustrated in FIG. 3, the base 101 of the actuator 100 is connected to the front frame 17 by means of a Cardan joint (not shown) connected to the base 101 by two lateral drive shafts 116.

A first tubular body 102, forming a first rod of the actuator 100, is provided to be attached at one end to the inner part 10b of the cowl 100 that it is intended to drive.

Means are provided for fastening said inner part 10b suitable for allowing the rotation of the first tubular body 102.

In one form, in reference to FIGS. 2 and 3 in particular, such means comprise lateral pins 21 connected to the first body 102 by means of a rolling bearing or ball bearing 22.

Each pin 21 is also connected by a connecting rod 23 to a shared rudder bar 24, said rudder bar 24 being fastened on a fastening element 25 secured to the inner part 10b of the cowl 10.

In one non-limiting example, such a fastening element 25 may be a single yoke or a double yoke 25.

Such means for fastening the first body 102 to the inner part 10b of the cowl make it possible to react a single degree of freedom, i.e., the axial translation along the central axis of the nacelle, such that a misalignment of the three fastening points of the actuator 100 is allowed on the stationary structure 17 of the nacelle, the inner part 10b of the cowl 10, and the outer part 10a of the cowl 10, respectively, causing the variation of the jet nozzle outlet section.

The first drive shaft 104, housed in the first body 102, is able to translate the first body 102 relative to the stationary front frame 17.

In another form, this first drive shaft 104 is a driving screw, of the ball screw type.

The first body 102 of the actuator 100 then comprises any means suitable for cooperating with the ball screws 104, for example, a ball nut 103.

The first drive shaft 104 is furthermore intended to connect to the base 101 of the actuator, in which its upstream end is housed.

The upstream end of the first drive shaft 104 is rotatably mounted in the base 101 using any suitable means, and for example rolling bearings 117.

Furthermore, a second tubular body 105, forming a second rod of the actuator 100, is provided to be attached, at a downstream end, to the outer part 10a of the cowl 10 that it is intended to drive to vary the jet nozzle outlet section.

Means 30 are suitable for locking the rotation of the second body 105.

The second body 105 is thus provided, at its downstream end, with a fastening socket 30 and a secured yoke intended to cooperate with the outer part 10a of the cowl, that connection not allowing the body 105 to rotate.

Any other device making it possible to prevent the body 105 from rotating may be considered.

A second drive shaft 106, housed in the second body 105 and secured to the first body 102, is capable of rotating the second body 105 relative to the stationary front frame 17.

In one alternative form, the second drive shaft 106 is also a driving screw 106 of the ball screw type.

The second body 105 of the actuator 100 then comprises any means suitable for cooperating with the ball screw, for example a ball nut 107.

It should be noted that the ball screws 104, 106 of the two shafts 104, 106 may have identical or different pitches, thereby making it possible to give each of the two bodies 102, 105 of the actuator 100 a speed that is respectively identical or unique.

Furthermore, the actuator 100 comprises locking means 120 suitable, in the locked position, for prohibiting any translation of the first body 102 of the actuator 100 relative to the base 101 while leaving it free to rotate.

As illustrated in particular in FIG. 2, in one form, the locking means 120 comprise one or more hooks 121 mounted either on the base 101 or on the first body 102 of the actuator 100 and a protruding ring 122 mounted on the face 101 on the first body 102 of the actuator 100 if applicable, the hooks 121 and the ring 122 being complementary locking means suitable for cooperating with each other.

To allow the first body 102 of the actuator 100 to rotate, the ring 122 is a ball bearing.

Furthermore, to rotate the first drive shaft 104, it is possible to provide electric motorized driving means (not shown).

These driving means comprise a single motor capable of driving a single shaft, which in turn imparts its movement to a single output shaft connected to the first drive shaft 104.

No output shaft connected to the second drive shaft 106 is necessary to drive said shaft 106, as described hereinafter.

In fact, according to the present disclosure, the first and second bodies 102, 105 of the actuator 100 are mounted in series using the second drive shaft 106, which is mounted stationary at the downstream end of the first body 102 of the actuator 100 and extends it.

Furthermore, the two drive shafts 104, 106 belong to same actuating chain, in which:

when the locking means 120 are in the position locked on the first body 102 of the actuator 100, the second drive shaft 106 translates the second body 105 of the actuator 100 relative to the first body 102, and when the locking means 120 are in the unlocked position on the first body 102 of the actuator 100, the first drive shaft 104 translates both the first and second body 102 of the actuator 100 relative to the stationary front frame 17.

In this latter position of the locking means, the second body 105 of the actuator 100 is thus connected in axial translation in the downstream direction with the first body 102 of the actuator 100.

Owing to the present disclosure, a single drive chain:

moves the first body 102 of the actuator 100, and consequently of the inner part 10b of the cowl 10, and moves the second body 105 of the actuator 100, and consequently the outer part 10a of the cowl 10 when rotation of the first body 102 of the actuator 100 is blocked. Consequently, the mass and costs of the thrust reverser actuating system are decreased.

The operation of a linear actuator 100 according to the present disclosure is as follows.

FIG. 4 shows the actuator 100 during a phase for varying the jet nozzle section. During that phase, the locking means 120 are in the locked position on the first body 102 of the actuator 100. The translation thereof is then prohibited.

The first drive shaft 104 being rotated by the motor, it imparts a same rotational movement to the first body 102 of the actuator 100.

The second drive shaft 106 being mounted stationary on the first body 102 of the actuator 100, it is also rotated.

Inasmuch as the rotation of the second body 105 of the actuator 100 is locked, the rotation of the second drive shaft 106 causes a corresponding translational movement of the second body 105 of the actuator 100 in the downstream direction of the actuator 100.

This drives the movement, in the downstream direction of the reverser, of the outer part 10a of the cowl 10, varying the jet nozzle outlet section.

At this stage, the inner part 10b of the cowl 10 is kept fixed in the closed position, thereby covering the cascade vanes 11.

A brake may be provided to lock the rotation of the first drive shaft 104, so as to keep the outer part 10a of the cowl 10 in an intermediate position between its nominal jet nozzle section position and its maximum positioned downstream from the reverser, offering a maximum jet nozzle outlet section.

FIG. 5 shows the actuator 100 during a thrust reversal phase.

During this phase, the upper part 10a of the cowl 10 is in a position having a maximum jet nozzle outlet section variation.

The second body 105 of the actuator 100 is thus maximally deployed toward the downstream direction of the actuator 100, just as the outer part 10a of the cowl 10 is translated maximally in the downstream direction of the reverser, as described relative to FIG. 4.

At that point, the unlocking of the locking means 120 is ordered. This thereby allows the first body 102 of the actuator to be translated.

The first drive shaft 104 being rotated by the motor, it imparts a translational movement to the first body 102 of the actuator 100.

The second body 105 of the actuator 100 being maximally deployed toward the downstream direction of the actuator 100, the ball nut 107 cooperating with the second drive shaft 106 is at the end of its travel, which inhibits any rotation of the second shaft 106 and, consequently, any translation of the second body 105 of the actuator 100 relative to the second drive shaft 106.

The rotation of the first drive shaft 104 leads to the downstream translational movement of the actuator 100 both of the first and second bodies 102 of the actuator 100 relative to the stationary front frame 17.

The inner part 10b of the cowl 10 is consequently moved in the downstream direction of the thrust reverser to close off the tunnel 9 and perform the thrust reversal.

FIG. 6 shows the movements opposite those illustrated in FIG. 5, corresponding to a return to the closed position of the inner 10b and outer 10a parts of the thrust reverser cowl 10.

The force applied on the lateral pins 22 generally being greater than that applied to the fastening yoke 30 at the downstream end of the second body 105 of the actuator 100, the first rotating drive shaft 104 first leads to the rotation of the first body 102 of the actuator 100 and the second drive shaft 106 until the end-of-travel abutment of the ball nut 107 cooperating with the second drive shaft 106 in the retracted position.

Any rotation of the second drive shaft 106 is then prohibited, which causes the first body 102 of the actuator 100 to be translated in the upstream direction, toward the base 101.

If necessary, the relocking of the locking means 20 on said first body 102 of the actuator 100 is then ordered.

It will be noted that this drive system meets many safety demands and is particularly reliable.

In fact, the locking means 120 are part of the triple line of defense locking system of the cowl 10.

Although the present disclosure has been described with one particular example form, it is of course in no way limited thereto and encompasses all technical equivalents of the described means as well as combinations thereof if they are within the scope of the present disclosure.

Thus, for example, it is possible to consider having a system with a double Cardan joint in place of the connecting rod 23 and rudder bar 14 system described above: this is kinematically equivalent, but makes it possible to place the force reaction in a direction very close to that of the axis of the cylinder, and therefore to reduce parasitic forces.

It is possible to use several double-action linear actuators according to the present disclosure for a same thrust reverser cowl.

As previously indicated, the double-action linear actuator according to the present disclosure may be used in other applications.

What is claimed is:

1. A double-action linear actuator for moving a first element and a second element relative to a stationary element, said actuator comprising:
   a first tubular body provided with means for attaching said first tubular body to the first element to be moved,
   a first drive shaft, housed in the first tubular body and translating the first tubular body relative to the stationary element, wherein said first drive shaft is actuated by an actuating chain,
   a second tubular body including a means for attaching said second tubular body to the second element to be moved, and
   a second drive shaft, housed in the second tubular body and translating the second tubular body relative to the stationary element,
   wherein the first tubular body and the second tubular body are mounted in series by means of the second drive shaft, which is mounted stationary on the first tubular body, wherein the second drive shaft is also driven by the actuating chain such that the first drive shaft and the second drive shaft belong to a same actuating chain and the second drive shaft translates the second tubular body relative to the first tubular body when locking means of the first tubular body are in a locked position, and wherein the first drive shaft translates both the first tubular body and the second tubular body relative to the stationary element when the locking means are in an unlocked position.

2. The actuator according to claim 1, wherein the actuator comprises a base attached to the stationary element and supporting the first drive shaft.

3. The actuator according to claim 2, wherein the first drive shaft is mounted rotatably relative to the base.

4. The actuator according to claim 2, wherein the locking means prohibit any translation of the first tubular body relative to the base while leaving it free to rotate relative to the base.

5. The actuator according to claim 1, wherein the means for attaching the second tubular body to the second element is configured to lock rotation of the second tubular body.

6. The actuator according to claim 1, wherein the means for attaching said first tubular body to the first element to be moved allows rotation of the first tubular body.

7. The actuator according to claim 6, wherein the means for attaching said first tubular body to the first element to be moved comprise pins connected to the first element by means of a rolling bearing or ball bearing and by a connecting rod-rudder bar assembly mounted on the first element to be moved.

8. The actuator according to claim 6, wherein said means for attaching said first tubular body to the first element comprise a double Cardan joint.

9. The actuator according to claim 1, wherein the first drive shaft and the second drive shaft are ball screws.

10. The actuator according to claim 9, wherein pitches of the ball screws are different.

11. The actuator according to claim 1, wherein the actuator comprises a single drive motor with a single output shaft driving only the first drive shaft.

12. A thrust reverser for a turbojet engine comprising means for deflecting at least part of an air flow of the turbojet engine; and
   at least one cowl translatable in a direction substantially parallel to a longitudinal axis of a nacelle able to move alternatively from a closed position in which it provides aerodynamic continuity of the nacelle and covers the means for deflecting, to an open position which opens a passage of the nacelle and exposes the means for deflecting, wherein said at least one cowl comprises at least one end part forming a jet nozzle, said one end part being mounted translatably relative to rest of the at least one cowl, and said at least one cowl further comprises the actuator according to claim 1 allowing movement of the at least one cowl and the jet nozzle.

* * * * *